L. S. LACHMAN.
COMPOSITE METAL WORK.
APPLICATION FILED FEB. 8, 1918.
1,278,480.
Patented Sept. 10, 1918.
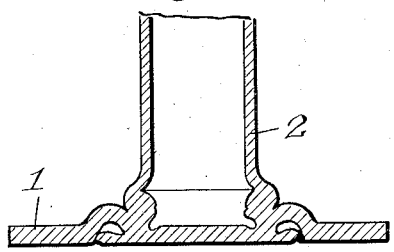
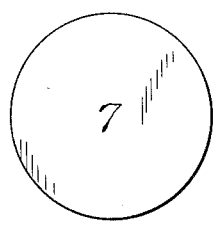
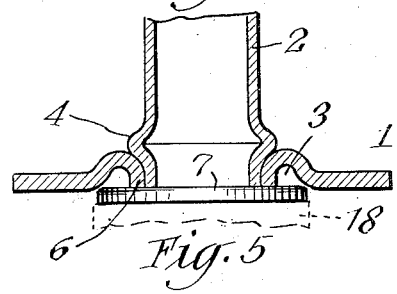
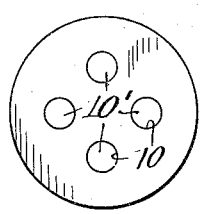
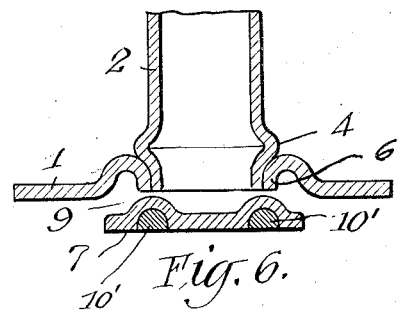
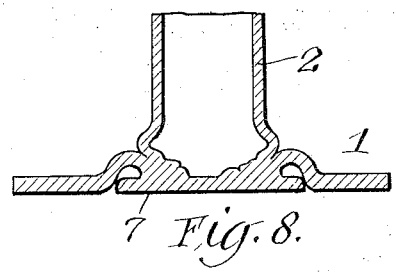
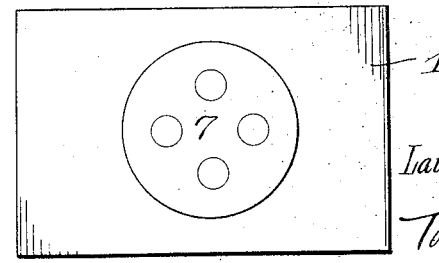
INVENTOR
Laurence S. Lachman
BY
ATTORNEYS

UNITED STATES PATENT OFFICE.

LAURENCE S. LACHMAN, OF NEW YORK, N. Y.

COMPOSITE METAL-WORK.

1,278,480.

Specification of Letters Patent. Patented Sept. 10, 1918.

Application filed February 8, 1918. Serial No. 215,977.

*To all whom it may concern:*

Be it known that I, LAURENCE S. LACHMAN, a citizen of the United States, and a resident of New York, in the county of New York and State of New York, have invented certain new and useful Improvements in Composite Metal-Work, of which the following is a specification.

My invention relates to composite metal work and more particularly to metal work the elements of which comprise a base preferably in the form of a plate and a tube projecting from one face of said plate and united therewith by a welded union.

My invention comprises essentially a base provided with a flanged opening, a tube fitted in said opening and projecting from one face of the base and a welded union formed between the edge of the tube and a welding piece engaging the edges of said elements and all united into a homogeneous joint.

My invention further consists in the method of uniting two metal pieces in parallelism edge to edge by assembling them side by side in contact, applying a uniting piece to contact with said edges and subjecting the whole to heating current and pressure to form a homogeneous union of all the pieces.

The invention further consists in details of construction more particularly hereinafter described and then specified in the claims.

Figure 1 is a vertical section of a piece of finished composite metal work constructed in accordance with my invention.

Fig. 2 shows the elements assembled for a welding operation by which the finished joint Fig. 1 may be produced.

Fig. 3 is a plan view of the welded uniting plate or piece used in forming the joint.

Fig. 4 is a plan of a modified form of plate or uniting piece that may be used in forming a joint similar to that shown in Fig. 1.

Fig. 5 shows the parts assembled for welding when the form of plate illustrated in Fig. 4 is employed.

Fig. 6 is a vertical section through the joint formed from the parts assembled as shown in Fig. 5.

Fig. 7 shows in detail one of the filler pieces used for the welding plate or piece shown in Fig. 4.

Fig. 8 is a plan of the joint made from the parts assembled as in Fig. 5.

1 indicates the base element or plate and 2 indicates the projecting element in the form of a tube. The element 1 on the face opposite that from which the tube projects is provided with a countersink indicated at 3 which may be formed by a press or die and which permits all portions of the finished union to be located below the floor or face of the element 1 as indicated in Fig. 1. Said countersink may be formed in a press or die so that a projection will be produced upon the face of said plate from which the tube 2 projects. The latter may be formed with a circumferential swell or projection 4 by an electric forging or other operation as well understood in the art, which is adapted to engage the annular projection on the face of plate 1 opposite the countersink. In the plate 1 there is formed a flanged opening adapted to receive the tube 2 and having its flange 6 projecting away from the face from which the tube projects. 7 indicates a welding plate or piece. In the finished joint the edges of the countersink and the plate are welded together and to said plate in a homogeneous joint as shown in Fig. 1 with the top surface of the plate 7 preferably flush with the surface of the plate 1. The annular projection 4 assists in holding the parts firmly together by engaging with the projection upon the surface of plate 1 made in producing the countersink.

The various elements of the joint prior to welding are shown assembled in their proper relation for union by the electric welding operation in Fig. 2, the welding electrode which engages the plate 7 and furnishes the required heating current and pressure to produce the welded union shown in Fig. 1 being indicated in dotted lines 18. It will be understood that the flange and the edges of the tube which are united edge to edge are arranged in parallelism with one another and preferably in light or imperfect contact with one another and with the plate 7 at the beginning of the operation, which imperfect contact together with the imperfect contact of the surface of the plate and the edges of the pieces, furnishes a resistance for the heavy low voltage current that assists in bringing the same to welding heat preliminary to the application of the pressure by which the three elements are united into a homogeneous joint shown in Fig. 1.

To assist in the welding operation, the uniting piece 7 may be provided with contact projections 9 indicated in Fig. 5 to form partial or imperfect contact between the plate or uniting piece 7 and the edges of the tube and the flange. These projections may be struck up in the piece 7 in a die or press, the result of which operation is obviously the formation of depressions as indicated at 10 in the plan view Fig. 4. When the welding plate or piece has these depressions it is preferable to employ in conjunction therewith the filler pieces 10', one of which is indicated in the plan view Fig. 7. These filler pieces are of proper size to fit the depressions and are located therein prior to the welding operation, as indicated in the view Fig. 5.

The imperfect contact between said filler pieces and depressions results in the heating of the same when the joint is formed and produces a joint homogeneous or integral as to all of the elements employed in producing the same and as illustrated in the vertical section Fig. 1. Ordinarily, however, the outline of the filler pieces can be distinguished in the surface of the welded piece 7 when the joint is finished. By the use of the filler pieces a smooth surface is secured over the whole face of the element 1. It will be understood however that I do not limit myself to any particular manner of modifying the flat welding piece shown in Fig. 2 to assist in the welding operation.

What I claim as my invention is:—

1. Metal work comprising a base, and a tube inserted in a flanged opening in the base and welded by its end to the edge of the flange and to a plate applied to the flange and tube end to form a homogeneous or integral joint.

2. Metal work comprising a base, and a tube inserted in a flanged opening in the base and welded by its end to the edge of the flange and to a plate applied to the flange and tube end to form a homogeneous or integral joint, said plate and welded joint being located in a countersink formed in the face of the base from which the flange projects.

3. Metal work comprising a base, and a tube inserted in a flanged opening in the base, said flange and tube end being welded to one another and to a plate applied to them into a homogeneous or integral joint.

4. A welding plate or piece provided with struck up welding projections and having filler pieces welded into the depressions upon the unwelded face of said plate.

5. The method of uniting two metal pieces in parallelism edge to edge consisting in assembling them side by side in contact, applying a uniting metal piece in contact with said edges and subjecting the whole to heating current and pressure to form a homogeneous welded union of all the pieces.

6. Welded metal work comprising a uniting piece welded into a homogeneous joint on one face with the edges of two other pieces arranged in contact side by side and having upon its unwelded face filler pieces welded into depressions therein.

Signed at New York, in the county of New York and State of New York, this 7th day of February, A. D. 1918.

LAURENCE S. LACHMAN.

Witnesses:
F. B. TOWNSEND,
IRENE LEFKOWITZ.